Nov. 21, 1950 A. H. FREDRICK 2,530,427

STABILIZED FREQUENCY DIVIDER CIRCUIT

Filed Sept. 14, 1945

INVENTOR
ARDEN HUGO FREDRICK

BY

Ralph L. Chappell

ATTORNEY

Patented Nov. 21, 1950

2,530,427

UNITED STATES PATENT OFFICE 2,530,427

STABILIZED FREQUENCY DIVIDER CIRCUIT

Arden Hugo Fredrick, Boston, Mass., assignor, by mesne assignments, to the United States of America as represented by the Secretary of the Navy Application September 14, 1945, Serial No. 616,418

2 Claims. (Cl. 250—36)

This invention relates to frequency divider circuits and in particular to a stabilized blocking oscillator circuit for use as a frequency divider.

In many applications of electronic circuits it is desired to obtain a pulse of output energy corresponding to every $n$th pulse only of a series of periodic pulses fed into the circuit, and with no response or output corresponding to the intermediate input pulses. For example, if from such a circuit only every tenth input pulse produces an output pulse corresponding to it while the intermediate nine pulses do not cause any output, there is thus produced a periodic submultiple series of output pulses whose frequency is related to the series of input pulses by a definite ratio, in this case, one to ten. The principal difficulty to be overcome in circuits for this purpose is to assure that the output will be responsive to exactly the correct input pulse and not the one before or after it, as the result of some random variation in supply voltages and tube characteristics.

It is therefore the object of this invention to provide a frequency dividing, blocking oscillator circuit which is largely insensitive to variation in supply voltages and tube characteristics, and hence stable and reliable in its operation.

Figure 1:
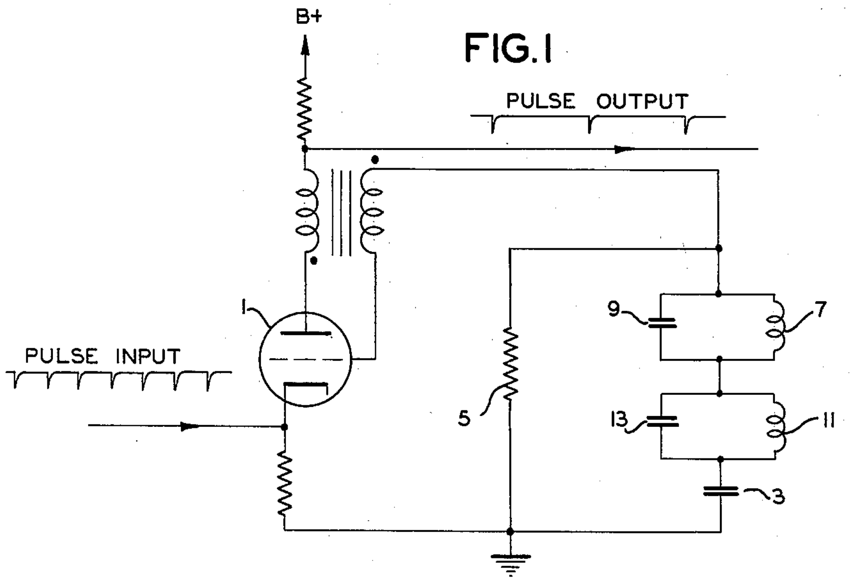
Figure 2:
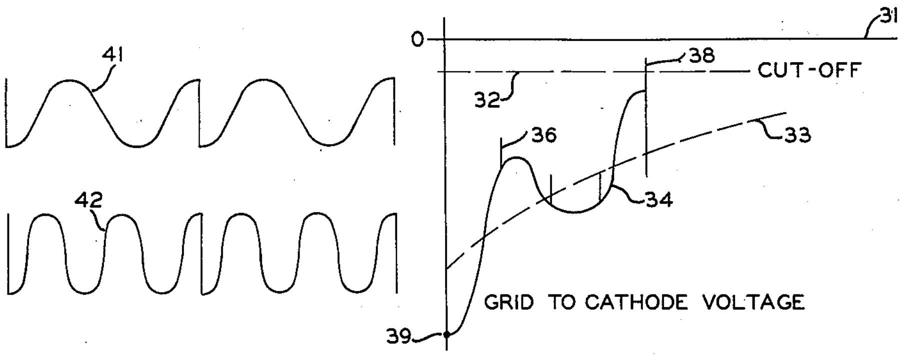

Fig. 1 is a circuit diagram of a blocking oscillator, conventional in all respects except for the addition in series in the grid circuit of two parallel resonant L-C ringing circuits; and Fig. 2 is a graph showing the form of the net grid-to-cathode voltage relation which is produced by the combination of voltages, from input pulses, the ordinary blocking oscillator operation, and A. C. voltages deriving from the inserted L-C circuits.

Referring now to Fig. 1, there is shown a blocking oscillator triode tube 1 having conventional close transformer coupling, approximating unity coupling. The grid circuit of this circuit, like that of the conventional blocking oscillator, has a capacitor 3 and a resistor 5 in parallel. Here, however, there is also inserted in the grid circuit, in series, two L-C parallel resonant ringer circuits one consisting of inductance 7 and capacitor 9 and the other of an inductance 11 and capacitor 13. As is well known, the grid-to-cathode voltage of the blocking oscillator is rapidly driven considerably negative when the tube conducts (thus ending conduction quickly) and normally rises back from below cutoff to conduction level again along an exponential curve determined by the time constant of the R-C circuit of resistor 5 and capacitor 3. (This is indicated by the dotted line 33 of Fig. 2.) In the present circuit, however, the current induced in the grid circuit when the tube 1 conducts must also pass through the capacitors 9 and 13. When the oscillator blocks, and the tube 1 ceases to conduct, oscillations are set up in the two L-C circuits inserted in the grid circuit. The resonant frequencies of these two circuits are chosen in this instance so that two different A. C. voltages are produced and such that their algebraic addition produces an A. C. voltage with high crests and low ones, which resultant wave is superimposed on the conventional R-C grid return curve. If properly chosen values are used, the circuit may be adjusted so that the incoming pulses will not carry the tube into conduction except upon coincidence with a peak which is made to occur near the frequency division period desired.

Fig. 2 shows the character of the grid cathode voltage variation. There is shown the zero reference axis 31 and the cutoff voltage line 32. Dotted line 33 represents the curve which the voltage would follow in returning from its cutoff value back toward conduction value. Superimposed on it are shown the first resultant of the A. C. voltages from the L-C ringers represented by line 34. The incoming pulses being fed to the cathode circuit are shown also, one for example being pip numbered 36. When the net result of grid return potential 33, A. C. voltage 34 and a pulse, for example 38, combine to reach a grid-cathode voltage difference which is above the cutoff value 32, then conduction will occur and the cycle of events will repeat.

Fig. 2 also shows two A. C. voltages 41 and 42 which might be produced by the respective L-C ringing circuits. The resultant 34, which is in this instance a periodic irregular wave form, has been shown superimposed on the normal grid return line 33. It should be understood, however, that the L-C ringing combinations need not be restricted to two particular ones, but that various combinations of amplitude, frequency, and number, of A. C. components may be employed, adapted to any particular frequency division ratio desired. While one specific circuit has been described and shown, it should be understood that the principles of the invention may be achieved by other combinations of elements. In the conventional blocking oscillator, the grid return path is of relatively small slope in the neighborhood of its approach to the cutoff line, and hence when it is being used as a frequency divider a small variation will cause conduction to result from a superimposed pulse before or later than the pulse desired. Thus if the normal grid curve should drop a trifle or if the pulse amplitude should decrease a trifle the conduction would be postponed to a later pulse than the one in the desired series. However, by also superimposing on the grid return curve an alternating voltage of suitable shape and frequency, the pips or pulses immediately preceding and immediately following the desired pulse can be dropped, or submerged, so to speak, well below the conduction point while the desired pulse may be lifted on a positive crest to well above the normal grid return curve, and so conduction upon arrival of each desired pip is doubly assured, producing the desired output pulses in response.

I claim:

1. In a circuit for dividing the frequency of a repeated succession of pulses, a blocking oscillator circuit including an electron tube having at least an anode, a cathode, and a control grid, a pulse transformer having its primary and secondary windings respectively connected to the anode and grid of said tube, a first resistor serially connected between said secondary and ground, a plurality of parallel combinations of inductance and capacitance serially connected with a condenser and in parallel with said resistor, a second resistor being connected from said cathode to ground, and means for applying said train of pulses to said cathode, said parallel combinations of inductance and capacitance being of such values that the resultant of the alternating voltages produced therein when said oscillator blocks is an alternating voltage having alternate high and low crests, said alternating voltage when superimposed on the grid-cathode voltage of said tube thereby raising certain desired submultiple pulses of said train of input pulses and greatly depressing pulses immediately preceding and immediately following said desired pulses whereby a desired submultiple series of output pulses is obtained independently of variation in supply voltage and tube characteristics.

2. In a blocking oscillator circuit for the frequency division of a repeated succession of input pulses, a plurality of parallel combinations of inductance and capacitance serially connected in the grid circuit of said blocking oscillator, said parallel combinations being of such values that the resultant of the alternating voltage produced therein when said oscillator blocks is an alternating voltage having alternate high and low crests, said alternating voltage when impressed on the grid-cathode voltage of said blocking oscillator thereby raising certain desired submultiple pulses of said succession of input pulses and greatly depressing pulses immediately preceding and immediately following said desired pulses whereby a desired submultiple series of output pulses is obtained independent of variation in supply voltage and tube characteristics.

ARDEN HUGO FREDRICK.

REFERENCES CITED

The following references are of record in the file of this patent:

UNITED STATES PATENTS

| Number | Name | Date |
|---|---|---|
| 1,930,278 | Marrison | Oct. 10, 1933 |
| 1,934,574 | Vos | Nov. 7, 1933 |
| 2,013,806 | Osnos | Sept. 10, 1935 |
| 2,205,233 | Van Slooten | June 18, 1940 |
| 2,277,000 | Bingley | Mar. 17, 1942 |
| 2,341,396 | Smith | Feb. 8, 1944 |
| 2,358,297 | Bedford | Sept. 19, 1944 |
| 2,399,135 | Miller et al. | Apr. 23, 1946 |